United States Patent [19]

Rosendahl

[11] 4,110,791
[45] Aug. 29, 1978

[54] TELEVISION PROJECTOR SYSTEM

[75] Inventor: Gottfried R. Rosendahl, Winter Park, Fla.

[73] Assignee: The United States of America as represented by the Secretary of the Navy, Washington, D.C.

[21] Appl. No.: 788,383

[22] Filed: Apr. 18, 1977

[51] Int. Cl.² .......................... H04N 5/66; G02F 1/01
[52] U.S. Cl. .................................. 358/233; 358/232; 350/361
[58] Field of Search .............................. 358/232–234, 358/61, 62, 236, 231; 350/161 P, 161 S, 161 R, 360, 361

[56] References Cited

U.S. PATENT DOCUMENTS

| | | | |
|---|---|---|---|
| 2,411,155 | 11/1946 | Gorn | 358/232 |
| 3,424,863 | 1/1969 | Johnson | 358/236 |
| 3,538,251 | 11/1970 | Gear | 358/233 |

Primary Examiner—John C. Martin
Attorney, Agent, or Firm—Richard S. Sciascia; Don D. Doty

[57] ABSTRACT

An optical image generation and projection system is disclosed as including a light relay type image generator for transforming an invisible electronic signal into a visible amplitude modulated image having interferential contrasts on an oil layer and a light source and lens system associated therewith in such manner as to project the optical image generated thereby onto a projection screen.

18 Claims, 4 Drawing Figures

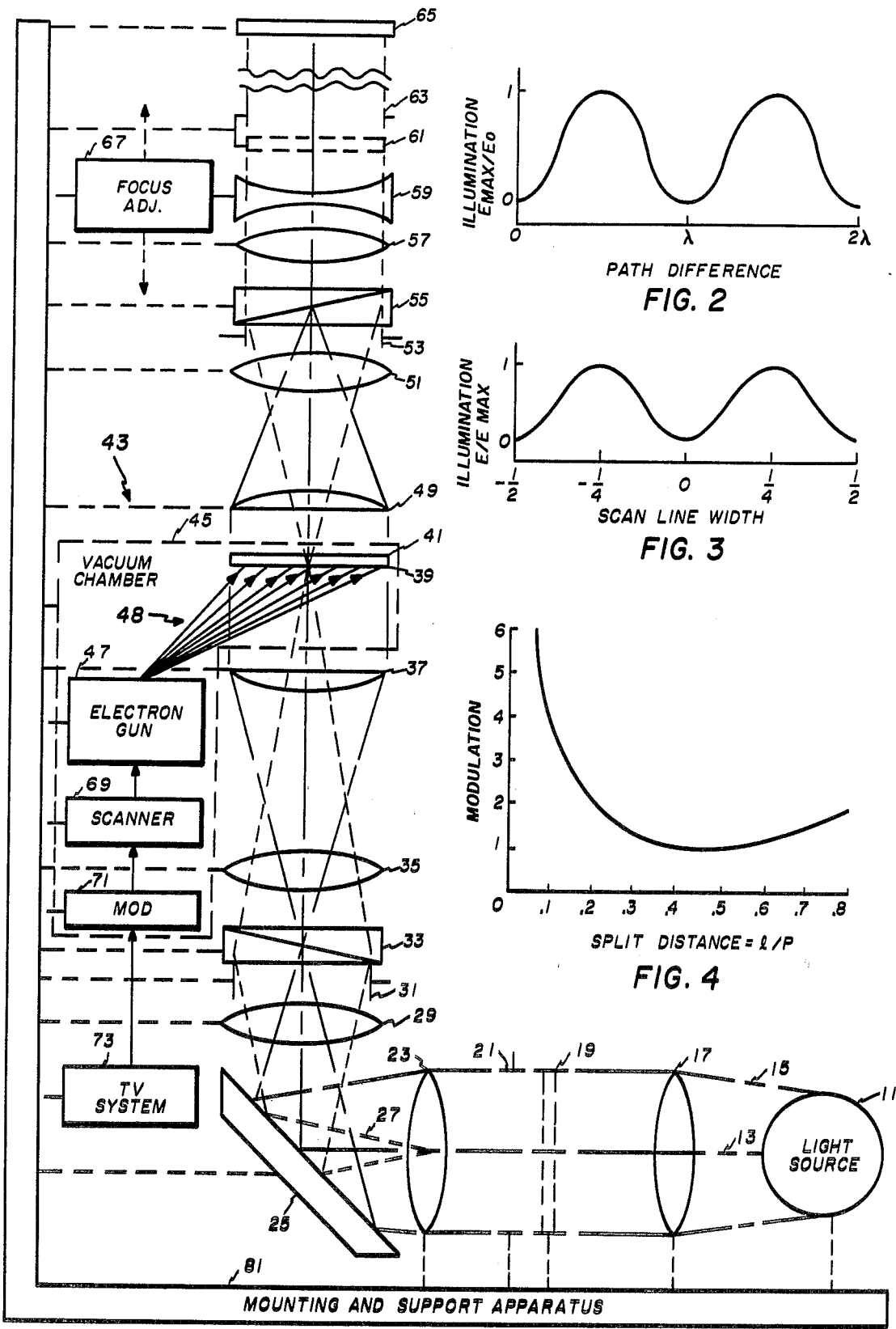

TELEVISION PROJECTOR SYSTEM

FIELD OF THE INVENTION

The present invention, in general, relates to television projection systems and, in particular, to light-relay television projectors, wherein the modulated electron beam from an electron gun mechanically modifies an oil or other responsive light relay surface layer in such manner that images are generated thereat. In even greater particularity, the subject invention comprises an improved method and means for optically transforming a non-visible electronic/mechanical image into a visible "amplitude modulated" image having interferential contrasts and for projecting it onto a projection or viewing screen.

DESCRIPTION OF THE PRIOR ART

Heretofore, numerous light projection systems have been employed for projecting and portraying images on viewing screens, and, of course, for many purposes they have been quite satisfactory. Such prior art systems are too numerous to discuss comprehensively — especially those incorporating cathode ray tubes — but there are several conventional, commercially available, prior art, television projectors which utilize a light relay and amplification technique which would ostensively be worthy of note at this time. They could, for instance, be called light relay television projectors or relay projector types, and they both use sensitive layers which produce reliefs on the surfaces thereof when electron beam images are impacted or written thereon. Such reliefs occur on such surfaces because of the interplay between electrostatic and mechanical forces, and then — in the prior art being discussed — such reliefs are transformed into amplitude modulated optical images by the Toepler's Schlieren method using an array of bars and slits, as discussed, for instance and in general, in an article by B. H. Schardin, entitled Die Schlierenverfahren und ihre Anwendungen, published in Berlin, Germany in 1943, and by E. Baumann in the artical entitled The Fisher Large Screen Projection System in the journal SMPTE, Vol. 60, page 351, published in 1953.

In the aforementioned cathode ray tube situations, there are inherent limitations on the available light flux which, of course, limits the brightness of the images produced thereby, and in situations using an array of bars and slits, the bar system must always be parallel to the scan lines of the writing electron beam. Thus, use of such bar systems for obtaining an amplitude modulated image on a projection screen from a phase modulated surface — such as an oil surface, or the like — has some disadvantages for some purposes. For example, in such cases, the widths of and the spacing between the bars must be attuned to the number of scan lines per inch or the widths of the scan lines; otherwise, the quantity and quality of light output would be adversely affected. Therefore, increasing the total number of television lines over the height of the format from, say, 675 to 1024 would result in a decrease of 50% in screen brightness. As far as is known, there is no practical remedy for such disadvantage except the subject invention. In addition, the bar system has a deleterious affect upon image quality, due to optical diffraction effects, on account of the small width of the bars and the spacings therebetween. Such things make an increase of resolution illusory when the number of television raster lines is increased. Thus, picture or image resolution is optically limited by factors other than the television system that may be associated therewith. Moreover, since the scan lines must be parallel to the Schlieren bars, an influence upon the projected image by raster shaping is impossible for all practical purposes.

Raster shaping is a technique that substantially eliminates lens distortion (and perhaps other distortions as well), depending on the design thereof. But shaping the raster in such way that it counteracts said distortions causes the lines thereof to not be parallel and of equal distances from each other throughout the entire picture frame, thereby precluding the using of such corrective raster shaping techniques in combination with the aforesaid Schlieren bar systems. Hence, as may readily be inferred from the above, for some purposes, all of the aforesaid prior art leaves something to be desired.

Other prior art devices — with or without Schlieren optical systems, respectively — are disclosed in U.S. Pat. Nos. 3,424,863 to Johnson, 3,517,126 to Yamada et al, 3,538,249 to Graser et al, 3,538,251 to Gear, 3,541,992 to Herrick et al, 3,582,185 to Steiger et al, and 3,100,817 to Rosendahl, each of which discloses a light valve image projection system somewhat similar to but structurally and patentably distinct from the instant invention.

SUMMARY OF THE INVENTION

The present invention overcomes some of the disadvantages of the known prior art, including those most closely related to the subject invention mentioned above. Briefly, then, it may be said that this invention comprises a unique combination of a specific, white light, interferential device with a light-relay type television projector.

Therefore, an important object of the invention is to provide an improved television projection system.

Another object of the invention is to provide a television projection system which may be used in conjunction with raster shaping.

Still another object of the invention is to provide a television projection method and means having resolution that is not restricted by the widths of the spaces between Schlieren bars.

A further object of the invention is to provide an improved television projection system which has no Schlieren bars incorporated therein.

Another object of this invention is to provide a television projection system with increased resolution which does not cause increased light loss.

Other objects and many of the attendant advantages of this invention will be readily appreciated as the same becomes better understood by reference to the following detailed description when considered in connection with the accompanying drawing wherein:

BRIEF DESCRIPTION OF THE DRAWING

FIG. 1 is a schematic representation of the television projection system constituting the subject invention;

FIG. 2 is a graphical representation of the maximum light projected as a function of the path difference through the modulated medium measured in the optical wavelength thereof;

FIG. 3 is a graphical representation of the relative distribution of light across the image of one scan line being subjugated to interferential contrast; and FIG. 4 is a graphical representation of the electron beam modulation required to keep the projected light contrast within the subject invention.

DESCRIPTION OF THE PREFERRED EMBODIMENT

Referring now to FIG. 1, there is shown a light source 11, such as, for instance, a high intensity Xenon arc type of light source, which directs at least a portion of its light along an axis 13 constituting both a light path and an optical axis along which various and sundry lenses and other optical elements are spatially disposed.

In the preferred embodiment of the invention being discussed, a folding optical axis and path are employed as a result of incorporation of a mirror therein, as will be discussed more fully subsequently; nevertheless, it should be understood that said optical axis and light path 13 may be straight or have any other geometrical configuration warranted by operational circumstances. Hence, said optical axis and path, being coincidental, have been referenced by single reference numeral 13, even though it changes directions at a substantially 90° angle, as it is shown in FIG. 1.

The light from light source 11, herewith defined as being an illumination pencil 15 of electromagnetic energy, is depicted in FIG. 1 as long dash — short dash — long dash lines, in order to distinguish it from the image pencil to be discussed more fully below and referenced at that time.

Of course, unless otherwise specified, all of the optical elements incorporated in the invention, including those mentioned above and below and their respective light and image pencils, are disposed at appropriate positions along the aforesaid optical axis and light path 13, regardless of the folding or non-folding thereof selected by the artisan. Moreover, the respective relative positions thereof thereon are intended to be without limitation, inasmuch as it would be well within the purview of one skilled in the art having the benefit of the teachings presented herewith to design each of said optical elements individually by using well known and conventional design formulae or other teachings and then place them accordingly, in order to make the subject television projection system useful for any given suitable purpose. Nevertheless, for completeness of disclosure of a single preferred embodiment thereof, a set of representative design parameters therefor will be presented subsequently. In the meantime, it would ostensively suffice to say that all of the elements incorporated in this invention are well known, conventional, and commercially available per se; thus, it is to be understood that it is their unique combination which forms a new and useful system that effects the improved results mentioned above.

Spatially disposed from light source 11 is a first collector lens 17 which images the light of light source 11 into infinity, and spatially and successively disposed from first collector lens 17 is a first polarizer 19 (the polarization of which is preferably 45° with respect to the horizontal), and a first field stop 21, and a second collector lens 23.

At this time, it would ostensively be noteworthy that the aforesaid polarizer 19 may be conventionally polarized in any manner or direction desired by the artisan for its intended purpose; however, for the sake of simplicity of disclosure, it may be noteworthy that said polarizer may be designed to have the aforesaid polarization at substantially 45° with respect to the horizontal, inasmuch as it works quite well. Polarizer 19 may also be placed anywhere between its neighboring elements that will cause the resulting combination thereof to optimize the total invention, with the distances involved therebetween being only a matter of design choice (dc).

In this particular preferred embodiment of the invention, as previously suggested, optical axis and path 13 are folded or redirected approximately 90°; and as may readily be seen from FIG. 1, a mirror or other reflector 25 is employed to implement such folding and redirecting. Hence, illuminator pencil 15 and an image pencil 27 (to be discussed subsequently) are likewise folded or redirected approximately 90°.

A first condenser lens 29 is, thus, disposed on folded (second) optical axis 13, followed by a first aperture diaphragm 31 thereon, the latter of which is, in this case, preferably 25 millimeters in diameter and is closely associated in an optical manner with a Wollaston prism 33 of comparable or slightly larger diameter. Condenser lens 29 is positioned in such manner as to image diaphragm 21 into infinity, and lens 23 is positioned in such manner as to image illumination pencil 15 from infinity into the aforesaid diaphragm 31.

As previously suggested, the Wollaston prism is a well known optical crystal, the advantage of which is that it does not introduce a discontinuity in the aperture of the lens system in which it is being used. It consists of two wedges made, for instance, of crystalline quartz that is cut in a predetermined well known way with respect to the crystal axis thereof. It splits light that is properly polarized into two light rays that are polarized in perpendicular directions with respect to each other, thereby forming an angle $\epsilon$ (which is too small to be shown in FIG. 1) therebetween, with said angle $\epsilon$ depending on the particular design of the Wollaston prism being used.

Spatially disposed from Wollaston prism 33 is a second condenser lens 35, which in combination with a field lens 37 images light source 11 and first aperture diaphragm 31 into infinity and also images the aperture of field stop 21 on a transparent oil layer 39 located on and adhering to one surface of a transparent (preferably glass) support membrane or plate 41.

Although oil layer 39 happens to be preferred as the "relay medium" or "sensitive layer" in this particular light relay tyype television projector, any other material may be substituted therefor that is suitable under the operational circumstances and is insensitive to its attitude in space, so that it will not be affected adversely by gravitational forces. Thus, for instance, it may be replaced by any material or jelly-like substance or structure that will not flow in accordance with gravitational forces and which, for most practical purposes, provides a relief that is approximately sinusoidal when scanned by an electron beam for reasons to be discussed in conjunction with FIGS. 2 and 3 subsequently. Some examples of such material are: (a) a plastic with a large amount of softener — such as, tri-cresyl-phosphate — incorporated therein; or (b) a vaseline-like silicon oil material, such as is used for lubrication purposes.

As may readily be seen from FIG. 1, oil surface 39 and support plate 41 are parts of a conventional light relay image generator 43, which also includes a vacuum chamber or tube 45 in which an electron gun 47 is disposed in such manner as to obliquely shoot focused electron beams 48 on the exposed surface of the aforesaid dielectric oil film 39. Since, as previously suggested, light relay image generator or projector 43 may be of any conventional type, several design choices therefor are disclosed in U.S. Pat. Nos. 3,538,251 to Gear, 3,424,863 to Johnson, 3,517,126 to Yamada et al, and 3,541,992 to Herrick et al, each of which discloses vacuum tube-like structural arrangements and effectively teaches membranes or films that are modulated by electron beams by scanning, modulating, and other apparatus for the purpose of forming images in optomechanical manners on one of the surfaces thereof.

Another field lens 49 is spatially disposed from that side of support plate 41 that is opposite oil layer 39, and it, in combination with a projector objective lens 51 spatially disposed therefrom, causes the illumination pencil to be imaged on a second aperture diaphragm 53 and another Wollaston prism 55 and, in addition, images oil layer 39 into infinity therethrough.

Wollaston prism 55 is, of course, the same kind of prism as the aforementioned Wollaston prism 33. However, it is placed in the optical train in the instant invention in such manner that it will re-unite the two beams split by said Wollaston prism 33 in a way that will cause them to have a phase difference of 180° therebetween if they are unaffected by oil layer 39.

Combined projector lenses 57 and 59 — the former of which has a positive focal length and is fixed in position, and the latter of which has a negative focal length and is movable along optical path 13 — are spatially disposed from Wollaston prism 55 in such manner that, when properly focused, image oil layer 39 through a second polarizer 61 (the polarization of which is preferably 135° with respect to the horizontal) and another field stop 63 onto a viewing or projection screen 65.

The aforesaid negative objective lens 59, being movable, is connected to a suitable manually or other operated focus adjustment mechanism 67, so that the focal length thereof may be changed as necessary to effectively focus whatever image is being created on oil film 39 at any given instant on projection screen 65, regardless of the distance thereto.

The aforesaid electron gun 47 has its input connected to the output of a scanner 69, the input of which is connected to the output of a modulator 71, with the latter two mentioned items being located inside vacuum chamber 45, as is depicted schematically in FIG. 1.

A suitable television system 73 has its output connected to the input of modulator 71, in order to provide the subject projector system with pictures or other image data to be generated at oil layer 39 and, thus, be projected therefrom.

All of the aforementioned elements are obviously connected to a conventionally designed mounting and support apparatus 81 by any appropriate attachment means, as respectively represented by the dashed lines therebetween. Naturally, one skilled in the art having the benefit of the teachings presented could design and construct said mounting and support apparatus to provide for whatever spacing is desired between the elements mounted thereon and supported thereby, in order to effect the proper positioning thereof for any given operational purpose. Likewise, the artisan could design the lenses and other elements directly or indirectly associated therewith, so that they would have whatever geometrical configurations, dimensions, focal lengths, materials, etc., necessary to provide an optimized image transformer and television projector having whatever overall length, diameter, etc., as would be practical for its intended use. Nevertheless, if so desired, the following example of element parameters (with all dimensions in millimeters or otherwise indicated as involving design choice (dc)) may be used to some advantage:

| Element No. | Focal Length | Combined Focal Length | Distance Between Neighboring Elements | Dimension |
|---|---|---|---|---|
| 11 | | | | 5 dia. |
| 17 | 50 | | 50 | |
| 19 | | | | |
| 21 | | | (dc) | |
| | | | (dc) 10 between elements 19 and 23 | |
| 23 | (dc) | | | |
| | | 250 | 249.4 | |
| 29 | 259.8 | | | |
| 31 & 33 | | | 15 | 25 dia. |
| 35 | 128.3 | | 15 | |
| | | 100 | 96.25 | |
| 37 | 113.2 | | | |
| 39 | | | 25 | 15 × 20 |
| | | | 10 | |
| 49 | 115.9 | | | |
| | | 100 | 98.5 | |
| 51 | 109.4 | | | |
| 53 & 55 | | | 15 | 25 dia. |
| 57 | 200 | | 15 | |
| | | 8000 | 100 | |
| 59 | −102.56 | | | |
| 61 | | | (dc) | |
| 63 | | | (dc) | |
| | | | Approx. 8000 between elements 61 and 65 | |
| 65 | | | | 1200 × 1600 |

To supplement the above exemplary information, it may be stated, for instance, that for a one thousand line television system, line separation on oil layer 39 will equal 15/1000 or 0.015 millimeters. And when the sum of the focal lengths of lenses 35 and 37 equals the sum of the focal lengths of lenses 49 and 51 equals one hundred, the split angle for both of the Wollaston prisms is 0.015/100 or 0.00015 radian or $\frac{1}{2}$ minute of arc.

Again, for purpose of emphasis, it should be understood that the above mentioned parameters are representative only; therefore, the artisan may select different ones, if he so desires, and if so doing suits his intended operational purpose for the invention. Hence, whether or not the aforesaid parameters are used with respect to the optical elements involved, all of the lenses and other optical elements discussed above (except, perhaps, electron image generator 43) may be designed by the artisan by using any one or all of the following:

(1) Military Standarization Handbook, Optical Design, MIL-HDBK-141, dated Oct. 5, 1962, published by and available from the Defense Supply Agency, Washington, D.C.

(2) Handbook of Military Infrared Technology, edited by William L. Wolfe, compiled by the University of Michigan under Contract Nonr 1224(12) with the Office of Naval Research. Published by Office of Naval Research in 1965, available from Supt. of Documents, U.S. Gov. Printing Office, Washington, D.C.

(3) Any similar textbook teaching the fundamental laws and methods of lens design, inasmuch as the actual dimensions used during the construction thereof would be contingent upon, among other things, the length and diameter desired for the subject television projector system.

MODE OF OPERATION

The operation of the invention will now be discussed briefly in conjunction with all of the figures of the drawing.

As may be seen in FIG. 1, light source 11 generates such radiant electromagnetic energy (light 15) as will subsequently project the image generated by electron beam modulated oil layer 39 onto viewing screen 65. Of course, such operation is accomplished as a result of white light 15 being collected by collector lens 17, shaped by field stop 19, polarized by polarizer 21, again collected by collector lens 23, redirected as desired by reflector 25, and condensed and confined to a predetermined illimination pencil or white light shaft by condenser lens 29 and aperture diaphragm 31, respectively.

Wollaston prism 33, one of the key components in the new combination of components constituting the subject system, then receives said prepolarized white light from condenser lens 29 and splits each ray thereof into two light rays polarized in perpendicular directions with respect to each other and forming an angle $\epsilon$ with respect to each other, with said angle $\epsilon$ depending upon the design of the two wedges thereof. Of course, the design of Wollaston prisms for given intended uses has been thoroughly documented in textbooks dealing with the subject of crystal optics and, thus, so doing in this case would be well within the purview of the artisan having the benefit of the teachings presented herein.

After being split into two polarized light rays, the light is imaged into infinity by condenser lens 35 and field lens 37, thereby causing them to be separated by a distance $l$, as it impacts on oil layer 39. Obviously, angle $\epsilon$ and distance $l$ would have to be exaggerated if shown in FIG. 1. And, of course, the impact of said light rays on oil layer 39 and the projection thereof therethrough ultimately causes pictures or other information to be projected onto viewing screen 65.

The projected pictures from oil layer 39 are actually generated therewith by electron beams 48 which are, as previously indicated, originated by and shot from electron gun 47. The proper modulation thereof in such manner as to represent television pictures, in turn, causes the surface of oil layer 39 to be mechanically modified in such way that changes on the surface thereof are introduced which are representative of the image content of the television picture to be viewed. Of course, the projection of said image content is, in the instant invention, obtained with the help of the aforementioned light source 11 and the optical elements effectively associated therewith. Because the modulated surface of oil layer 39 optically represents a "phase modulated object" — that is, an object without distribution of dark and light areas to obtain a visible image directly — the projection device must transform the phase modulated object into an amplitude modulated image. In other words, such amplitude modulation occurs because the picture content desired to be projected on viewing screen 65 is generated by television system 73, after which it is modulated by modulator 71, after which scanner 69 causes modulated electron beams 48 to scan oil layer 39, depositing electron charges on the surface thereof that represent the image content of any particular TV frame in the form of modulated scan lines. Then, because of the counteraction between electrostatic forces of the non-uniform charge distribution and surface tension, the previously smooth surface of oil layer 39 is transformed into a picture profile that is capable of being projected by the aforementioned plurality of pairs of light rays of processed light beam 15, as they continue their travel along optical axis 13.

The projection of said picture profile continues as said plurality of pairs of light rays pass through field lens 49, projector objective lens 51, and second aperture diaphragm 53 before impacting on second Wollaston prism 55, another of the key elements of the invention. At Wollaston prism 55, they are reunited, so as to form interference fringes which depend upon the difference between the respective optical paths thereof.

Because of the characteristics of Wollaston prisms in general and Wollaston prism 55 in particular, a path difference of zero between the rays of each pair of the aforesaid projected light rays will produce a dark fringe thereat, and a path difference thereof of $\frac{1}{2} \lambda$ (where $\lambda$ equals the medium wavelength of light or 0.555 nm for white light) will produce a white fringe thereat. Intermediate difference values produce gray tones, the darkness of which is proportional thereto in accordance with the aforesaid characteristics.

Referring now to FIG. 2, there is shown in graphical form the variation of maximum illumination (E$max$) of the projected light as a function of the path difference ($d$) of the rays of light split by Wollaston prism 33. In general, in transmitted light, $$d = (n-1)t, \qquad (1)$$

where, as mentioned above, $d$ = the path difference between the two light rays split by the Wollaston prism, as they pass through different thicknesses of oil layer ripple, $t$ = the thickness of the ripple of the modulated surface of the oil layer, and $n$ = the index of refraction of the oil layer.

Therefore, the substantially sinewave curve — ideally representing the modulated reliefs of oil layer 39 — indicates how the illumination intensity of the light traveling along light path 13 would vary with the differential thickness on the aforesaid oil layer 39, as it is being modulated to form images thereon by electron beam 48 from electron gun 47. In this particular instance, such illumination intensity is indicated as E$max$/E$o$ on the ordinate scale, in order to express it in terms of a maximum intensity situation, where E$o$ equals the illumination that would occur in the image plane of oil layer 39 if polarizers 21 and 61 were not incorporated in the invention. For instance, as may readily be seen from the curve of FIG. 1, the illumination intensity (E$max$/E$o$) increases from dark to light as the sinewave increases in amplitude from 0 to 1 and in period from 0 to one-half wavelength ($\lambda$) of the light involved.

In the preferred embodiment of the invention disclosed herewith, the aforementioned split distance $l$ is made equal to about one-half to one times the half width of the scan lines on oil surface 39. If said oil surface — or the surface of whatever material is used for this purpose — is not modulated, the path difference between the two projected light rays is zero, and at least part thereof (perhaps all thereof) will appear dark. If the modulation of oil surface 39 produces a projected light path difference of one-half, the surface of the corresponding part thereof will appear bright (or white, if a white light is used), since ½ λ constitutes the maximum possible modulation. In other words, that path difference of ½ λ will be produced, assuming a maximum modulation in the scan line relief of oil layer 39 is, likewise, $t = \frac{1}{2} \lambda/(n-1)$, and, thus, one ray of light passes through a crest of that scan line relief, and the other through a trough thereof. That is the reason why the split distance $l$ should be made about one-half of the scan line width — although if so desired for other reasons, said split distance may optionally be designed to deviate therefrom. For example, if $l$ is only one-fourth of the scan line width, the light modulation will drop by only 15%, and such drop may easily be compensated by increasing the modulation of oil surface 39 by an equivalent amount, as best seen in FIG. 4, unlike the known prior art, where no such compensation is possible.

FIG. 3 depicts the relative distribution of illumination (E) across the image of one scan line that is subjugated to interference contrast in terms of $E/Emax$ vs. scan line width in, say, millimeters. Hence, from the curve therein, it may be seen that maximum illumination occurs every half scan line width during optimum conditions and, thus, such conditions occur whenever lateral displacement $l$ equals one-half the ripple in the modulated surface of oil layer 39.

FIG. 4 illustrates that variations of the split distance between the two light or illumination rays (represented by $l/p$) may be compensated by varying the intensity of the oil layer modulating electron beam from electron gun 47. Thus, it may be seen that raster shaping is possible in the subject system. Of course, inspection of the curve of FIG. 4 will indicate that the optimum split distance that will keep the illumination ($Em$) at a maximum would be approximately 0.5 of the scan line width $p$, but that a small variation therefrom may be easily and automatically compensated, if so desired by the artisan. Therefore, the ordinate scale provides an indication of the increase of modulation by electron beam 48 required to keep Em constant if $l \neq \frac{1}{2} p$.

Still assuming a maximum modulation of $\frac{1}{2} \lambda / (n-1)$ in the relief of oil layer 39 but with each of the two projected light rays penetrating the scan line relief at equal distance from the crest of the scan line, the path difference between the two pencils will be zero and, thus, a dark fringe will be produced. From this, it follows that the number of apparent scan lines in the picture image will be doubled as compared with the number of scan lines in the object. That means that the visibility of the scan lines in the image will be considerably reduced, thereby decreasing the visibility of scan lines in the projected image, the latter of which constitutes a considerable advantage over the known prior art.

The artisan will recognize that the kind of interference utilized in the instant invention does not require highly coherent and monochromatic light, because the path differences of the two interfering projected light pencils is restricted to a maximum of ½ λ, and because the split angle ε between those two light pencils is very small. Split angle ε corresponds to the resolution in the TV image — and, therefore, to the total resolution — if the TV channel determines such total resolution, as it usually does.

After passing through Wollaston prism 55, the reunited light pencils are projected further through projector objective lenses 57 and 59, the latter of which is position adjustable by focus adjustment 67, so that after passing through polarizer 61 and field stop 63, the image being generated or constructed in the surface of oil surface 39 at any given instant is projected onto screen 65 for the viewing thereof by any suitable observer (not shown).

It would perhaps be noteworthy that, in the subject invention, the aforementioned condenser lens system has been split into two lenses 29 and 35 and the aforesaid projection lens system has been split into two lenses 51 and 57/59 in such way that oil surface 39 (or the image formed on it by field lens 37) is situated in the back focal plane of condenser lens 35. The image of oil surface 39, in the optical space for Wollaston prism 33, is then at infinity, since said Wollaston prism 33 is placed in front of lens 35. Front condenser lens 29 restores the overall focal length of the total condenser lens system, which is necessary to image the aperture of collector lens 23 into the surface of oil layer 39. In the same way, the first lens 51 of the projector lens system images the surface of oil layer 39 into infinity. Since Wollaston prism 55 is positioned behind lens 51, the image of the surface of oil layer 39 is again at infinity in the optical space in which said Wollaston prism 55 is situated. Second lens combination — comprising fixed lens 57 and focus adjusting lens 59 — images, when in focus, the surface of oil layer 39 from infinity to viewing screen 65, thereby reducing imaging errors or aberrations that may otherwise adversely affect the quality of the image produced at screen 65. Moreover, correction of residual aberrations in forming the image of oil layer 39 on screen 65 may be achieved by the proper design of projection lenses 57 and 59 by the artisan. In addition, it is now possible to make the optical train from Wollaston prism 33 to Wollaston prism 55 symmetrical with respect to the surface of oil layer 39. With this in mind, it should be readily apparent to the artisan having the benefit of the teachings presented herewith that the optical elements which cause parallel light rays to pass through Wollaston prism 33, oil layer 39, and Wollaston prism 55 constitutes a new combination of elements, the advantages of which are (1) that the danger of the Wollaston prisms adversely affecting the quality of the final image is reduced to a minimum and (2) that the oil layer effects the imaging of Wollaston prism 33 into Wollaston prism 55 and, therefore, a possible adverse effect upon the interference phenomenon is also reduced to a minimum.

To recapitulate briefly, and for purpose of emphasis, the aforementioned optical operations are facilitated within the subject invention because:

I. With respect to illumination pencil 15:
  1. Collector lens 17 images light source 11 into infinity, and collector lens 23 images said light from infinity into diaphragm 31; and
  2. Field lens 37 images diaphragm 31 into infinity, and therefore, light source 11 and field lens 49 form said light from infinity into diaphragm 53.

II. With respect to projection pencil 27:
  1. Condenser lens 29 images diaphragm 21 into infinity, and condenser lens 35 images the light from infinity onto oil layer 39; and
  2. Projection lens 51 images oil layer 39 into infinity, and projector lenses 57 and 59 image the light from infinity onto projection screen 65.

Such double imaging — that is, reciprocating illumination and projection — is sometimes called Kohler illumination; and, in general, the advantage thereof is that the danger of the component parts — such as, the filaments and other structure associated therewith — of the light source appearing in the final image is reduced to a minimum. However, the splitting of the condenser, field, and projector lenses into two lenses each — as has been done in the subject invention, with the corresponding images thereof produced at infinity, respectively — constitutes a new combination of elements which differ from Kohler illumination in both principle and structure.

From the foregoing, it may readily be seen that the instant invention constitutes some advancement in the light relay type of television projector art, due to the aforementioned unique and unobvious differences therebetween.

Obviously, many modifications and variations of the present invention are possible in the light of the above teachings. It is therefore to be understood that within the scope of the appended claims, the invention may be practiced otherwise than as specifically described.

What is claimed is:

1. A television projection system having a plurality of optical elements disposed along a predetermined optical path for projecting an image onto a reflective screen, comprising in combination:
   a light relay image generator disposed on a predetermined optical path;
   a first field lens spatially disposed upstream from said light relay image generator on said predetermined optical path;
   a second field lens spatially disposed downstream from said light relay image generator on said predetermined optical path;
   a first Wollaston prism spatially disposed upstream from first field lens on said predetermined optical path;
   a pair of condenser lenses respectively spatially disposed from but adjacent to the opposite sides of said first Wollaston prism on said predetermined optical path;
   a second Wollaston prism spatially disposed downstream from said second field lens on said predetermined optical path;
   a pair of projector lenses respectively spatially disposed from but adjacent to opposite sides of said second Wollaston prism on said predetermined optical path;
   a first predetermined light polarizer disposed downstream from said pair of projector lenses on said predetermined optical path;
   a radiant energy source located upstream of the aforesaid pair of condenser lenses on said predetermined optical path;
   means including a second predetermined light polarizer located on said predetermined optical path between said radiant energy source and the upstream projector lens of the aforesaid pair of projector lenses for the illumination thereof thereby and, thus, causing predetermined portions of the radiant energy from said radiant energy source to be projected downstream along the entire length of said predetermined optical path;
   a viewing screen disposed downstream of the downstream lens of the aforesaid pair of projector lenses on said predetermined optical path; and
   means effectively connected to the downstream lens of the aforesaid pair of projector lenses for effecting the adjustment thereof in such manner that the radiant energy projected downstream from said radiant energy source is focused on said viewing screen after passing through each of the aforesaid optical elements, including any image generated by the aforesaid light relay image generator.

2. The system of claim 1, wherein said radiant energy source is a white light.

3. The system of claim 1, wherein said radiant energy source is a high intensity Xenon arc lamp.

4. The system of claim 1, further characterized by a reflector means disposed a predetermined spatial distance downstream from said radiant energy source for redirecting the aforesaid optical axis at a predetermined angle.

5. The invention of claim 1, further characterized by means connected to the aforesaid light relay image generator for supplying signals thereto representative of the image to be generated thereby.

6. The device of claim 5, wherein said means connected to the aforesaid light relay image generator for supplying signals thereto representative of the image to be generated thereby comprises a television system.

7. A television projector system, having a predetermined optical path, for projecting an optical image onto a viewing screen comprising in combination:
   a transparent platform located on said predetermined optical path;
   means adhering to one side of said transparent platform for producing the aforesaid optical image on one of the surfaces thereof in response to the impact thereon by the scan lines of a predetermined radiant energy;
   a light source located on said predetermined optical path;
   a first collector lens spatially disposed from said light source on said predetermined optical path;
   a first light polarizer, having a polarization of forty-five degrees with respect to the general direction of the aforesaid radiant energy scan lines, disposed between said first and second collector lenses on said predetermined light path;
   a second collector lens spatially disposed from said first collector lens on said predetermined optical path;
   a first condenser lens spatially disposed from said second collector lens on said predetermined optical path;
   a first Wollaston prism spatially disposed from said first condenser lens on said predetermined optical path;
   a second condenser lens spatially disposed from said first Wollaston prism on said predetermined optical path;
   a first field lens spatially disposed between said second condenser lens and the aforesaid optical image producing means on said predetermined optical path;
   a second field lens disposed from said transparent platform on said predetermined optical path;
   a first projector lens means disposed from said second field lens on said predetermined optical path;
   a second Wollaston prism spatially disposed from said first projector lens on said predetermined optical path;
   a second projector lens means spatially disposed from said second Wollaston prism on said predetermined optical path; and
   a second light polarizer, having a polarization of 135° with respect to the general direction of the aforesaid radiant energy scan lines, disposed between said second projector lens means and the aforesaid viewing screen on said predetermined light path.

8. The device of claim 7, wherein said transparent platform comprises a clear glass plate.

9. The device of claim 7, wherein said means adhering to one side of said transparent platform for producing the aforesaid optical image on one of the surfaces thereof in response to the impact thereon of a predetermined radiant energy comprises an oil layer.

10. The invention of claim 7, further characterized by a field stop disposed between said first and second collector lenses on said predetermined light path.

11. The invention of claim 7, further characterized by a mirror disposed between said second collector lens and the aforesaid first condenser lens for redirecting said predetermined optical path in a predetermined manner.

12. The invention of claim 7, further characterized by a field stop spatially disposed from said second projector lens on said predetermined optical path.

13. The invention of claim 7, further characterized by:
a first aperture diaphragm contiguously disposed with the upstream side of said first Wollaston prism; and
a second aperture diaphragm contiguously disposed with the upstream side of said second Wollaston prism.

14. The device of claim 7, wherein said first and second Wollaston prisms each comprises two crystalline wedges that are cut in such manner with respect to the axis thereof that polarized light passing therethrough is split into a pair of light rays that are polarized in perpendicular directions with respect to each other.

15. The device of claim 7, wherein said light source comprises a high intensity Xenon arc lamp.

16. The invention of claim 7, further characterized by means effectively connected to each of the elements thereof for the mounting and supporting thereof in predetermined relative dispositions, respectively.

17. The device of claim 8, wherein said second projector lens means comprises:
a fixed projector lens having a positive focal length; and
a movable projector lens having a negative focal length, with the movement thereof being along the aforesaid predetermined optical path.

18. The invention of claim 17, further characterized by means effectively connected to said movable projector lens for effecting the movement and positioning thereof as desired along said predetermined optical path.

* * * * *